(12) United States Patent
Tate et al.

(10) Patent No.: US 7,395,895 B2
(45) Date of Patent: Jul. 8, 2008

(54) SEAT SWITCH

(75) Inventors: Thomas J. Tate, Reedsburg, WI (US); Ron L. Ziegler, Reedsburg, WI (US)

(73) Assignee: Seats, Inc., Reedsburg, WI (US)

( * ) Notice: Subject to any disclaimer, the term of this patent is extended or adjusted under 35 U.S.C. 154(b) by 305 days.

(21) Appl. No.: 11/293,434

(22) Filed: Dec. 2, 2005

(65) Prior Publication Data

US 2007/0125587 A1 Jun. 7, 2007

(51) Int. Cl.
*B60K 28/00* (2006.01)
(52) U.S. Cl. .................. 180/273; 200/85 R; 307/10.1; 307/10.6
(58) Field of Classification Search ................ 180/273, 180/272; 307/10.1, 10.3, 10.6; 200/85 R, 200/86 A
See application file for complete search history.

(56) References Cited

U.S. PATENT DOCUMENTS

| | | | |
|---|---|---|---|
| 3,487,451 A | 12/1969 | Fontaine | |
| 3,569,726 A * | 3/1971 | Reid et al. | 307/10.6 |
| 3,704,352 A | 11/1972 | Fontaine | |
| 3,860,773 A | 1/1975 | Fontaine | |
| 4,572,319 A | 2/1986 | Fontaine | |
| 6,361,117 B1 * | 3/2002 | Tate | 297/452.56 |
| 7,144,025 B2 * | 12/2006 | Wakita et al. | 280/250.1 |
| 7,162,344 B2 * | 1/2007 | Kojima et al. | 701/45 |

OTHER PUBLICATIONS

Cherry Corporation, Webpage, Miniature Snap-Action Switches, http://www.cherrycorp.com/english/switches/miniature/index.htm, publicly available prior to Dec. 2, 2004.
Cherry Corporation, Webpage, E Series Miniature Snap-Action Switches, http://www.cherrycorp.com/english/switches/miniature/e21.htm, publicly available prior to Dec. 2, 2004.
Cherry Corporation, Webpage, Miniature E Series, http://www.cherrycorp.com/english/switches/minature/pdf/E21_Series.pdf, publicly available prior to Dec. 2, 2004.

* cited by examiner

*Primary Examiner*—Eric Culbreth
(74) *Attorney, Agent, or Firm*—Michael Best & Friedrich LLP

(57) ABSTRACT

A seat switch for a seat having a resilient web includes device for sensing the presence of an operator sitting on the resilient web. The seat switch is operably connected to a vehicle circuit which may be for example an ignition system for the engine. The seat switch provides a signal to the vehicle circuit in response to sensing no operator present. The device for sensing may include a switch and a tension member mounted directly to the web. When an operator sits on the seat, the web stretches under the weight of the operator, which results in tension in the tension member. This tension activates the switch to send the operator-present signal to the vehicle circuit. When the operator's weight is removed from the seat, the tension is relieved from the resilient web and the switch discontinues the operator-present signal.

13 Claims, 5 Drawing Sheets

SEAT SWITCH

BACKGROUND

The present invention relates to a switch for sensing the presence of an operator sitting in a vehicle seat.

SUMMARY

The present invention is an improvement over the type of seat disclosed in commonly-assigned U.S. Pat. No. 6,361, 117, the entire contents of which are incorporated herein by reference. Such seats are used primarily in relatively small vehicles such as skid steer loaders, construction equipment, turf and lawn care vehicles, and any other small vehicle that is not primarily used for transportation on roads, but is instead used for work or recreation. Collectively, these types of vehicles are referred to herein as "off-highway" vehicles. While the primary focus of the present invention is for off-highway vehicles, it can be applied to other types of vehicles, as discussed below in the detailed description.

Seats for off-highway vehicles (whether the seat is of the elastic web style illustrated in U.S. Pat. No. 6,361,117 or of another style) typically include a bottom cushion for the comfort of the operator. Because of the nature of off-highway vehicles, and in some cases safety regulations, it is common to have an operator-presence switch within or under the bottom cushion of the seat. Such prior art operator-presence switches are typically of a type that is actuated under the compressive force resulting from the operator sitting on the seat cushion. These prior art switches are sometimes referred to in the industry as "pancake" and "plunger" switches. These switches are used to sense the presence or absence of an operator and only permit operation of the off-highway vehicle or some aspect of the off-highway vehicle (e.g., engagement of cutting blades in a lawn mower application) when an operator is sitting in the seat.

The present invention provides a seat comprising a seat frame including web support portions; a resilient web extending between and connected to the web support portions, and adapted to support an operator of a vehicle; and means for sensing the presence of an operator sitting on the resilient web; wherein at least a portion of the means for sensing is mounted directly to the resilient web and is operably connected to a vehicle circuit. The means for sensing may include means for sensing an increase in tension in the resilient web indicative of an operator sitting in the seat. Fasteners may extend through holes in the resilient web to secure the means for sensing directly to the web.

Other aspects of the invention will become apparent by consideration of the detailed description and accompanying drawings.

DETAILED DESCRIPTION

Figure 1:
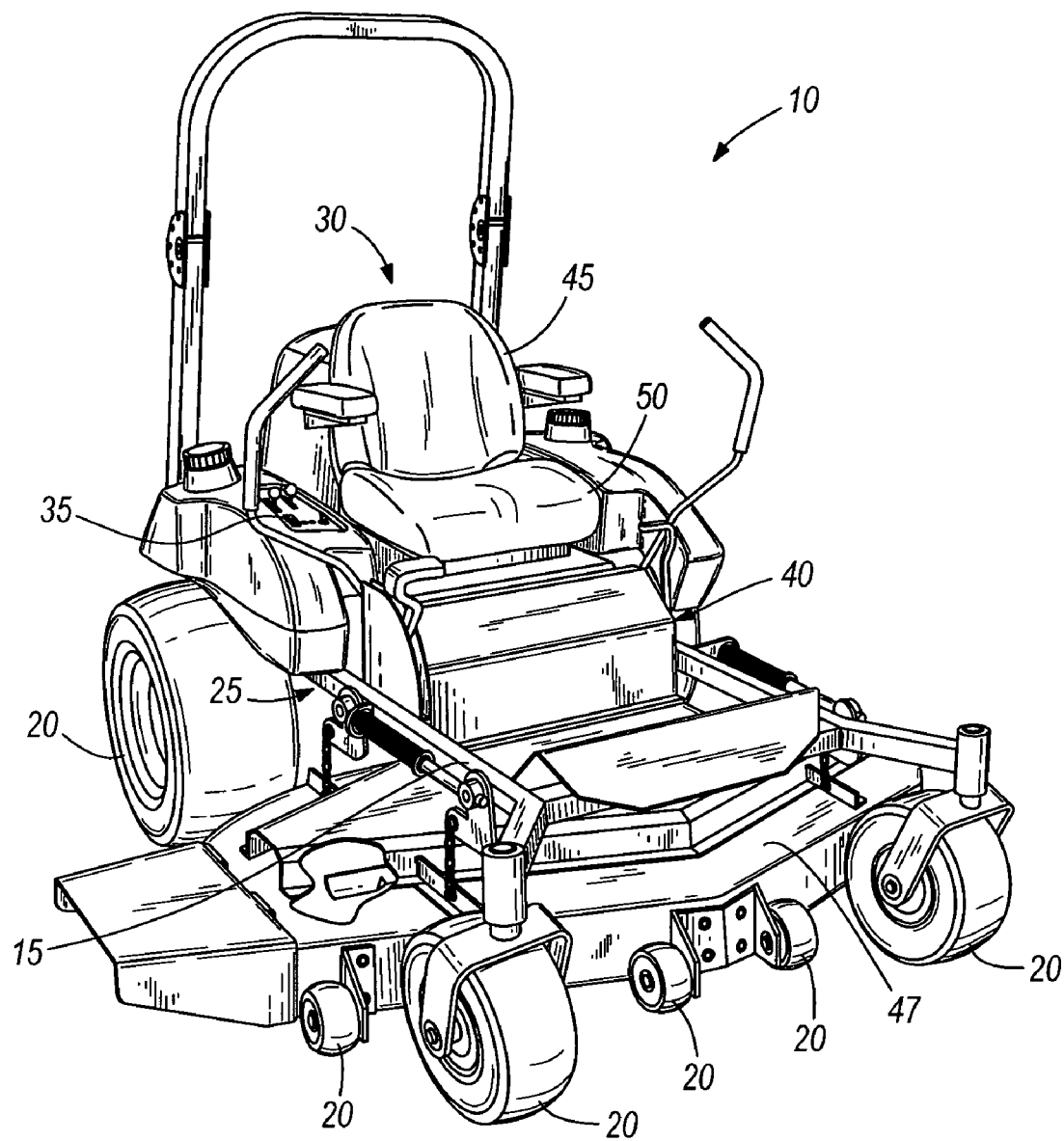
FIG. 1 illustrates an off-highway vehicle having a seat according to a first embodiment of the invention.

FIG. 1 illustrates an off-highway vehicle 10. The off-highway vehicle 10 includes a chassis 15, wheels 20 supporting the chassis 15, an internal combustion engine 25 mounted to the chassis 15, and a seat 30 mounted to the chassis 15. Although the illustrated off-highway vehicle 10 is commonly referred to as a turf maintenance vehicle or riding lawn mower, the invention may be embodied in other types of off-highway vehicles and is not limited to the application illustrated. As will also become apparent, the invention may be applied to vehicles other than off-highway vehicles.

The engine 25 includes an ignition system 35 that provides a spark or other event that drives combustion within the internal combustion engine 25. Although the engine 25 in the illustrated embodiment is of the internal combustion variety, the invention is applicable to any type of engine, and the term "ignition system," as applied to this invention, refers to the part of the engine that sustains its continued operation. The engine 25 drives rotation of at least one of the wheels 20 through a transmission 40. The engine 25 also selectively drives rotation of the cutting blade under a mower deck 47 to cut vegetation over which the vehicle 10 travels. The seat 30 includes back and bottom cushions 45, 50, respectively, to accommodate an operator of the vehicle 10.

Figure 2:
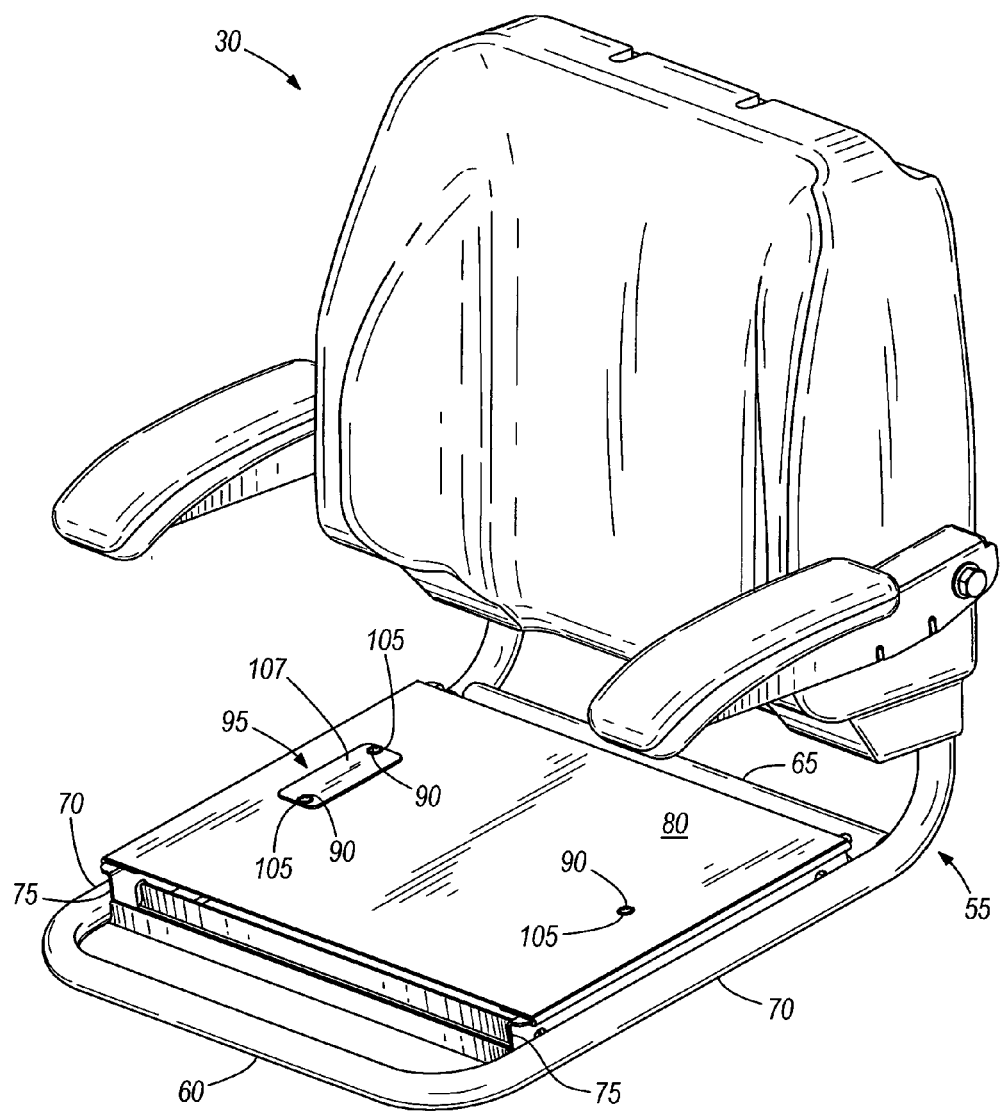
FIG. 2 is a perspective view of the seat of FIG. 1 with the bottom cushion removed.
Figure 3:
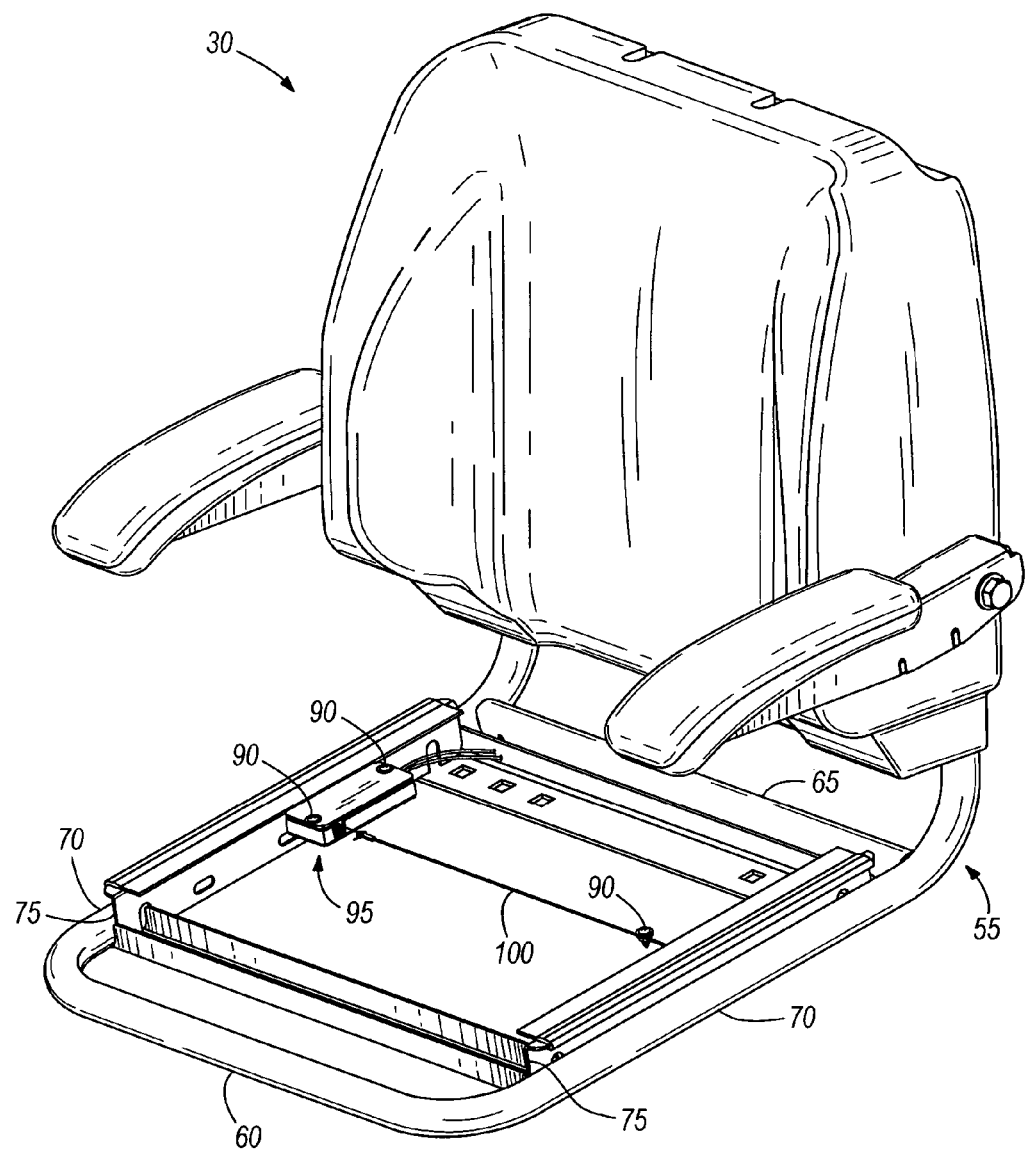
FIG. 3 is a view similar to FIG. 2 but with the resilient web of the support structure removed.

With reference to FIGS. 2 and 3, the seat 30 includes a seat frame 55 that includes front and rear portions 60, 65, respectively, and side portions 70 extending between the front and rear portions 60 and 65. The side portions 70 include flanges or web support portions 75. A resilient web 80 extends across the seat frame 55 and is mounted to the web support portions 75. The illustrated web 80 is made of a flexible, strong, resilient material such as Dymetrol® fabric. The web 80 supports the bottom cushion 50 of the seat 30.

Mounted to the bottom side of the web 80 with fasteners 90 are a switch assembly 95 and a tension member 100. The fasteners 90 extend through holes 105 in the web 80 material. A top plate 107 is positioned over the switch assembly 95 on the opposite side of the web 80 to improve the rigidity of the mounting to the web 80. While the illustrated fasteners 90 are threaded mechanical fasteners, other means for fastening the tension member 100 and switch assembly 95 to the web 80 may be employed, such as clips, hooks, glue.

Figure 4:
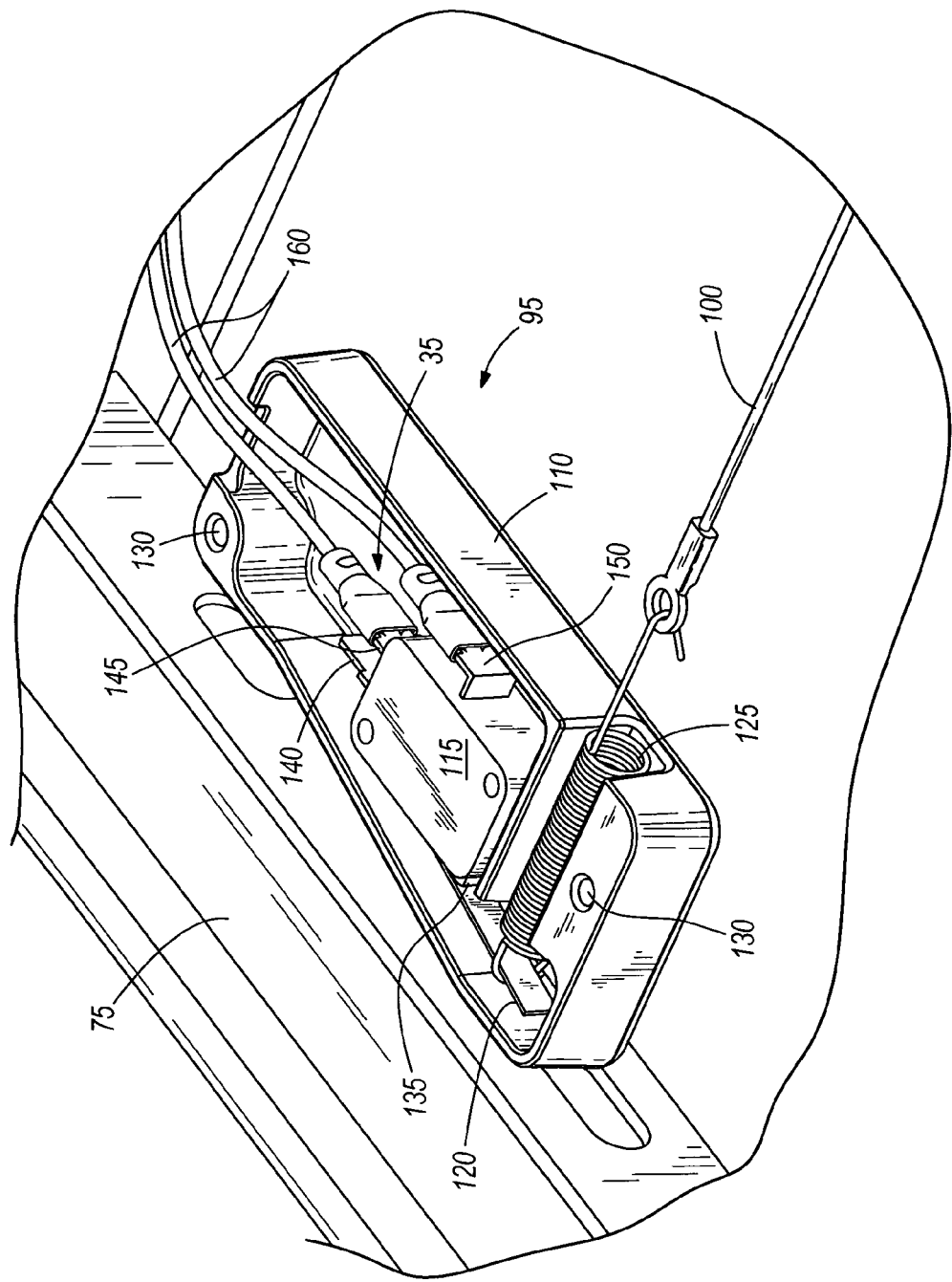
FIG. 4 is an enlarged view of the switch assembly of the support structure shown in FIG. 3.

With reference to FIG. 4, the switch assembly 95 includes a switch box 110 that contains a switch 115, an actuator 120, and a tension spring 125. The switch box 110 includes a pair of threaded holes or through holes 130 to accommodate the fasteners 90 that mount the switch assembly 95 to the web 80.

The switch 115 is mounted within the switch box 110 and is of a type commercially available from the Cherry Switch Company of Pleasant Prairie, WI and generally designated as a "miniature switch." The switch 115 includes a button 135 and three terminals: a normally closed ("NC") terminal 140, a normally open ("NO") terminal 145 and a common ("COM") terminal 150. The switch 115 is biased into connecting the NC and COM terminals 140 and 150, and disconnecting the NO terminal 145 from the COM terminal 150. When the button 135 is depressed and held, the COM terminal 150 is disconnected from the NC terminal 140 and placed into engagement with the NO terminal 145. When the button 135 is released, the COM terminal 150 is again connected to the NC terminal 140 and disconnected from the NO terminal 145.

In the illustrated embodiment, the switch 115 is in the engine's 25 ignition system 35, which includes wires 160 connected to the NO and COM terminals 145, 150. Because the present invention contemplates disabling the engine's 25 ignition system 35 when no operator is sitting in the seat 30, the wires 160 are connected to the NO and COM terminals 145 and 150, and the button 135 must be pressed to close the circuit and enable the engine 25 to operate. If the button 135 is released and returns to its at-rest position, the ignition circuit is opened and the engine 25 will not run. In alternative embodiments, the ignition wire 160 could be connected to the NC terminal 140 and the ignition circuitry could be modified to disable the engine 25 when the switch 115 is closed. It should also be noted that wireless control systems can be substituted for the hard-wired circuit illustrated. In such wireless control systems, the switch 115 would enable or disable a wireless signal generator to control the ignition system 35.

The actuator 120 is mounted to a side of the switch 115 and extends across the button 135. One end of the tension spring 125 is mounted to the actuator 120 and the other end is connected to an end of the tension member 100. Referring again to FIG. 3, the tension member 100 extends across the web 80 and the other end is mounted to the web 80. During assembly of the seat 30, the switch assembly 95 and tension member 100 are mounted to the web 80 such that the tension member 100 applies some tension to the spring 125. In this regard, the tension member 100 and spring 125 are "pre-tensioned."

The tension member 100 and spring 125 are not pre-tensioned so tight to cause the button 135 to be depressed, however. Rather, the amount of pre-tensioning is sufficiently close to actuating the button 135 such that a small marginal tension will actuate the button 135. The spring 125 must have sufficient stiffness to overcome the outward bias of the button 135. During operation of the turf maintenance vehicle 10, the small marginal tension is applied to the tension member 100 in response to an operator sitting on the seat 30 and causing the web 80 material to stretch.

The illustrated tension member 100 is a piece of wire or cable. In other embodiments, the tension member 100 may be constructed of other materials, provided it is able to transfer tension in the web 80 material (indicative of an operator sitting in the seat 30) to the spring 125 in the switch assembly 95. In alternative embodiments, the tension member 100 and spring 125 can be combined into a tension member having elasticity so it can be pre-tensioned.

Figure 5:
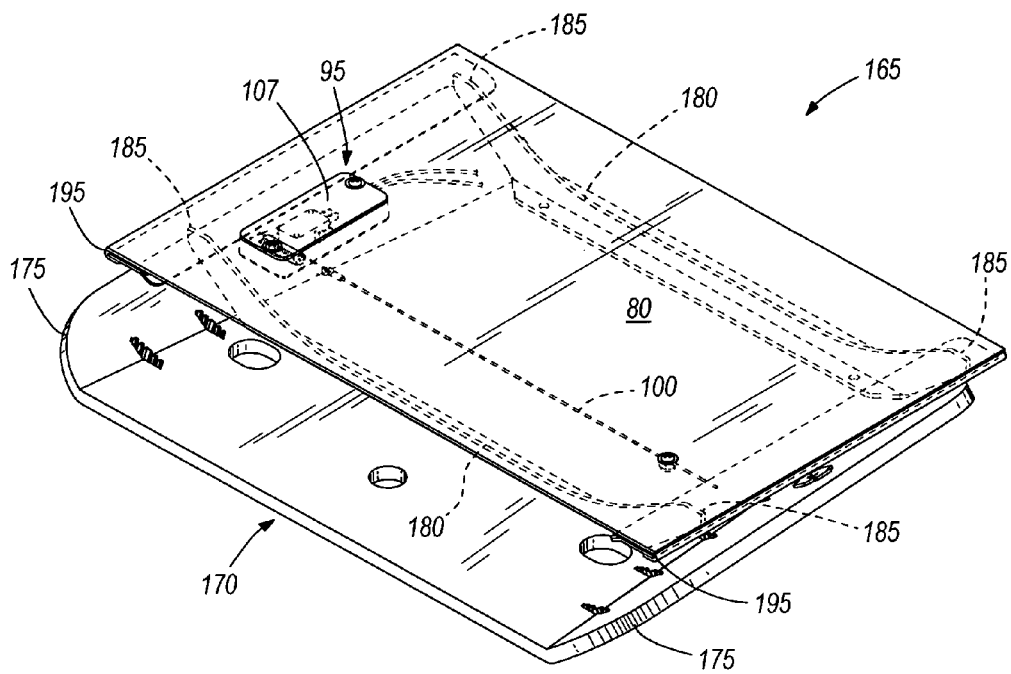
FIG. 5 is a perspective view of an alternative embodiment of the bottom seat portion of FIG. 3.
Figure 6:
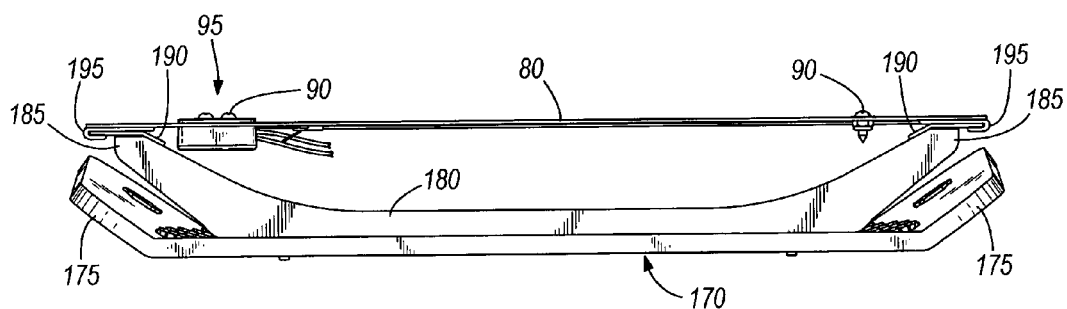
FIG. 6 is a front view of the bottom seat portion of FIG. 5.

FIGS. 5 and 6 illustrate an alternative embodiment of the seat support structure 165, similar to the construction illustrated in U.S. Pat. No. 6,361,117. In the alternative embodiment the seat 30 includes a bottom seat portion 170 that extends across the width and length of the seat 30 and has angled side end portions 175. This bottom seat portion 170 can be made from many materials including wood, metal, plastic, etc. Web supports 180 are connected to the bottom seat portion 170 and extend across the width of the seat. The ends 185 of the web supports 180 are angled upwardly. The web supports 180 can be made of many materials including wood, metal, plastic, etc.

Attached to the web supports 180 at the top of the angled portions 185 are flanges 190. The web 80 is attached to the flanges 190 with hooks 195 affixed to the web 80. The switch assembly 95 and tension member 100 are attached to the web 80 in the same ways as described for the previous embodiment and perform the same functions.

The switch assembly 95 and tension member 100 of the present invention may be used in applications other than the one illustrated and described above. The invention may be used to sense the presence of an operator in a seat and disable or enable a device other than an ignition system. For example and without limitation, the switch assembly 95 may be operably connected with air bag, seat belt, or seat warming systems. The switch assembly 95 may, for example, in the illustrated embodiment prevent engagement of the cutting blade under the mower deck 47 when an operator is not sitting in the seat, or automatically disengage the cutting blade when the operator gets out of the seat. The term "vehicle circuit" refers to all possible systems (including but not limited to those described above) in highway and off-highway vehicles that use as an input the presence of an operator sitting in the seat.

The invention claimed is:

1. A seat comprising:
   a seat frame including web support portions;
   a resilient web extending between and connected to the web support portions, and adapted to support an operator seated in the seat; and
   means for sensing the presence of an operator sitting on the resilient web and for providing operator-presence information to a vehicle circuit;
   wherein at least a portion of the means for sensing is mounted directly to the resilient web;
   further comprising a fastener directly securing a portion of the means for sensing to the resilient web, wherein the fastener extends through the resilient web.

2. The seat of claim 1, wherein the means for sensing includes means for sensing an increase in tension in the web indicative of an operator sitting on the web.

3. The seat of claim 1, wherein the means for sensing is adapted for use with an ignition system of an off-highway vehicle, and wherein the means for sensing disables the ignition system in response to sensing no operator present on the resilient web.

4. The seat of claim 1, wherein the seat frame includes front and rear portions, and wherein the opposite web support portions extend between the front and rear portions.

5. The seat of claim 1, wherein the means for sensing includes a switch directly attached to the resilient web.

6. The seat of claim 5, wherein the switch is biased towards opening the vehicle circuit and switches to close the vehicle circuit in response to the means for sensing detecting an increase in tension in the web indicative of an operator sitting on the web.

7. An off-highway vehicle comprising:
   a chassis;
   at least one wheel supporting the chassis;
   an engine mounted on the chassis;
   a transmission for driving the at least one wheel in response to operation of the engine;
   a seat frame including web support portions;
   a resilient web extending between and connected to the web support portions, and adapted to support an operator of the vehicle;
   a switch actuable between a first position in which the switch enables operation of the engine and a second position in which the switch disables the engine; and
   a tension member mounted directly to the web and operable to actuate the switch to the first position in response to tension applied to the web;
   wherein the switch is mounted directly to the web.

8. The off-highway vehicle of claim 7, wherein the engine includes an ignition system operably interconnected with the switch, the switch disabling the ignition system when in the second position.

9. An off-highway vehicle comprising:
   a chassis;
   at least one wheel supporting the chassis;
   an engine mounted on the chassis;
   a transmission for driving the at least one wheel in response to operation of the engine;
   a seat frame including web support portions;

a resilient web extending between and connected to the web support portions, and adapted to support an operator of the vehicle;

a switch actuable between a first position in which the switch enables operation of the engine and a second position in which the switch disables the engine; and a tension member mounted directly to the web and operable to actuate the switch to the first position in response to tension applied to the web;

wherein when the tension member is at a preset tension the switch is in the second position and wherein tension in excess of the preset tension in the tension member moves the switch to the first position.

10. An off-highway vehicle comprising:

a chassis;

at least one wheel supporting the chassis;

an engine mounted on the chassis;

a transmission for driving the at least one wheel in response to operation of the engine;

a seat frame including web support portions;

a resilient web extending between and connected to the web support portions, and adapted to support an operator of the vehicle;

a switch actuable between a first position in which the switch enables operation of the engine and a second position in which the switch disables the engine; and a tension member mounted directly to the web and operable to actuate the switch to the first position in response to tension applied to the web;

further comprising fasteners directly securing both tension member and switch to the resilient web.

11. The off-highway vehicle of claim 10, wherein the fasteners extend through the resilient web.

12. The off-highway vehicle of claim 10, wherein the resilient web defines a plurality of holes through which the fasteners extend.

13. A seat for an off-highway vehicle including a chassis, an engine including an ignition system, a transmission, and at least one wheel supporting the chassis and driven by the transmission in response to operation of the engine, the seat comprising:

a frame including web support portions;

a resilient web extending between and connected to the web support portions, and adapted to support an operator of the vehicle;

a tension member attached directly to the resilient web at a preset tension; and a switch connected to the tension member and directly attached to the resilient web, the switch having a first position that disables the ignition system and a second position that enables the ignition system;

wherein when the tension member is at the preset tension the switch is in the first position and when additional tension is applied to the tension member, the tension member shifts the switch to the second position;

wherein a fastener secures the tension member to the resilient web; and wherein the fastener extends through the resilient web.

* * * * *